Sheet 1 - 2 Sheets

I. C. Twining.
Harvester Rake.

Nº 29640     Patented Aug. 14, 1860

Witnesses.
J. W. Coombs
R. S. Spencer

Inventor.
I. C. Twining
per Munn & C.
Attorney

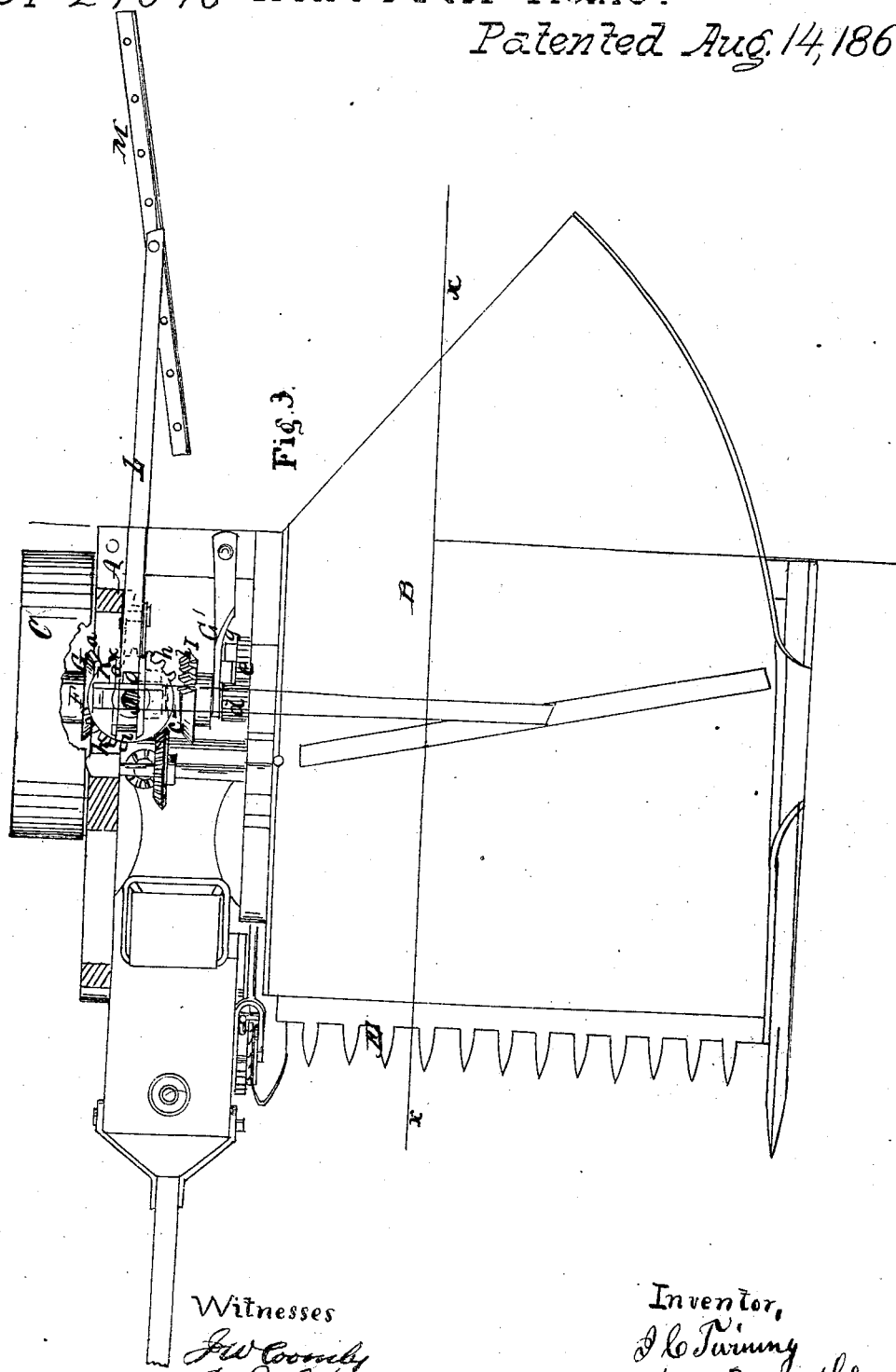

UNITED STATES PATENT OFFICE.

ISAAC C. TWINING, OF WRIGHTSTOWN, PENNSYLVANIA.

IMPROVEMENT IN AUTOMATIC RAKES FOR HARVESTERS.

Specification forming part of Letters Patent No. 29,640, dated August 14, 1860.

*To all whom it may concern:*

Be it known that I, ISAAC C. TWINING, of Wrightstown, in the county of Bucks and State of Pennsylvania, have invented a new and Improved Raking Device for Harvesters; and I do hereby declare that the following is a full, clear, and exact description of the same, reference being had to the annexed drawings, making a part of this specification, in which—

Figure 1:
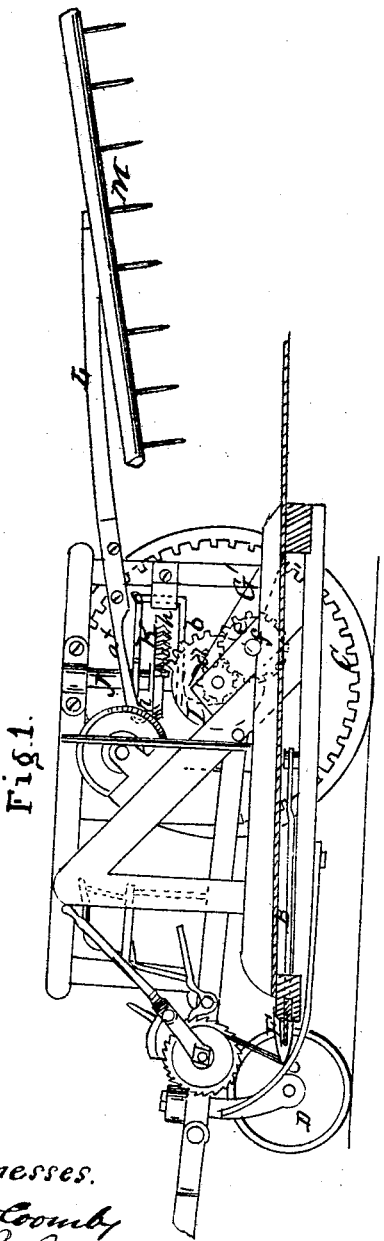

Figure 1 is a side sectional view of a harvester with my invention applied to it, $xx$, Fig. 3, indicating the plane of section; Fig. 3, a back sectional view of the same taken in the line $y$, $y$, Fig. 1; Fig. 3, a plan or top view of the same.

Similar letters of reference indicate corresponding parts in the several figures.

This invention relates to an improvement in that class of raking devices in which a vibrating rake is employed and arranged to sweep over the platform in the arc of a circle.

The within-described invention consists in a novel and improved means for operating the rake, substantially as hereinafter shown and described, whereby the two movements necessary to be given to the rake—to wit, the vibrating and the rising-and-falling one—may be obtained in a very simple and economical way, and the rake made to operate intermittingly when necessary.

To enable those skilled in the art to fully understand and construct my invention, I will proceed to describe it.

A represents the main frame of a harvester, and B the platform.

C is the driving or ground wheel, and D a caster-wheel, which supports the front end of a plank on which the driver's seat is placed, the back end of said plank being attached to the main frame A.

The sickle E, which may be of the usual reciprocating kind, is attached to the front end of the platform, which is curved at its outer side to correspond with the arc described by the rake in its movement.

The above parts may all be constructed and arranged in the usual way, and therefore do not require a minute description.

Figure 2:
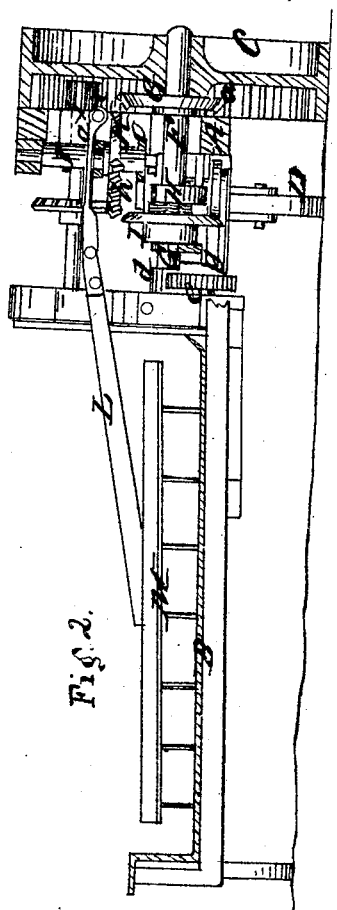

On the axle F of the wheel C there is placed a wheel, G, having a portion or section of its periphery toothed, as shown at $a$. On the axle F there is also placed a cam, H, and a wheel, I, the latter having only a portion or section of its periphery toothed, as shown at $b$. The wheel is allowed to slide on the axle F, but is connected to it by a feather and groove, so as to turn with the axle. Between the wheel I and the cam H there is placed a spiral spring, $c$, which has a tendency to keep the wheel I off from the cam H. On the inner end of the axle F there is placed a pinion, $d$, into which a pinion, $e$, on a shaft, $f$, gears. To the outer side of the pinion $e$ there is attached a cam, $g$, against which a lever, G, is pressed by the spiral spring $c$, the back end of said lever being attached to the back part of the main frame A. The front end of the lever G' is forked and is fitted on the axle F, and has the wheel I pressed against it by the spiral spring $c$. (See Figs. 2 and 3.)

In the main frame A there is placed a vertical shaft, J, on which there is a wheel, K, having two sections or portions, $h\ h$, of its periphery toothed, said toothed portion being at opposite sides of the wheel, as shown in Fig. 3.

To the upper surface of the wheel K there is attached by a joint, $i$, a rake-bar, L. The joint $i$ admits of the bar L rising and falling in a vertical plane, and said joint, being near the periphery of the wheel K, the latter serves as a crank for the rake-bar, as will be presently described. The inner end of the rake-bar has a metal link or strap, $a^x$, attached, through which the shaft J passes. The outer end of the bar L has a rake, M, attached, the length of which is equal to the width of the platform B.

On the vertical shaft J there is placed a bent sliding bar, O, the lower part of which rests on the cam H, the upper part sustaining the rake-bar L.

The operation is as follows: As the machine is drawn along the toothed portions $a\ b$ of the wheels G I gear alternately with the wheel K and give a vibrating motion to the rake-bar L and rake M, the wheel I moving the rake forward to the front end of the platform and the wheel N moving it backward. Previous to each forward movement of the rake the cam H elevates the rake-bar and retains it in an elevated position while it is moving forward, the cam allowing the rake to fall at the termination of its forward stroke or movement. As the rake moves backward it is in contact with the platform, and the cut grain is raked therefrom. As the rake reaches the termination of its backward movement the bar L is elevated, preparatory to its forward movement, by the action of the cam H on bar O. The forward movement of the rake does not always take place immediately at the termination of its backward movement, for the cam $g$ must first throw the wheel I in contact with wheel K, and said cam is so formed as to allow the rake to dwell or rest a certain time before moving forward. This arrangement admits of the platform receiving a necessary amount of grain to form a gavel before being taken off. In cases, however, where there are heavy crops, the wheel I may be kept up to wheel K by means of a pin or key, and no cessation of movement allowed the rake. Thus it will be seen that by a very simple arrangement of means the desired movements are given the rake.

I would remark that pinion $e$, with cam $g$, may be shifted beyond contact with the lever G, said lever being extended within reach of the driver, thus placing the movements of the rake under his control. This extension of lever G is not shown, as the mode of application is obvious and may in many cases be dispensed with entirely.

Having thus described my invention, what I claim as new, and desire to secure by Letters Patent, is—

1. The arrangement of the wheels I K G, toothed at their peripheries in sections, in connection with the bent bar O, cam H, and rake-bar L, attached to the upper surface of the wheel K, substantially as and for the purpose set forth.

2. The arrangement, with the wheel I, of the pinions $d$ $e$, cam $g$, and lever G' and spring $c$, substantially as shown, for the purpose of giving the necessary dwells or cessations of movement to the rake, as and for the purpose set forth.

ISAAC C. TWINING.

Witnesses:
EDWARD ATKINSON,
FRANCIS B. THOMPSON.